(12) United States Patent
Brunner et al.

(10) Patent No.: US 11,892,551 B2
(45) Date of Patent: Feb. 6, 2024

(54) SAFETY SYSTEM

(71) Applicant: SICK AG, Waldkirch (DE)

(72) Inventors: Fabio Brunner, Waldkirch (DE);
Markus Hammes, Waldkirch (DE);
Matthias Ams, Waldkirch (DE)

(73) Assignee: SICK AG, Waldkirch (DE)

( * ) Notice: Subject to any disclaimer, the term of this patent is extended or adjusted under 35 U.S.C. 154(b) by 152 days.

(21) Appl. No.: 16/953,842

(22) Filed: Nov. 20, 2020

(65) Prior Publication Data
US 2021/0156951 A1  May 27, 2021

(30) Foreign Application Priority Data
Nov. 26, 2019 (DE) .......................... 102019132024.0

(51) Int. Cl.
*G01S 5/02* (2010.01)
*G01S 17/894* (2020.01)
(Continued)

(52) U.S. Cl.
CPC .............. *G01S 5/0284* (2013.01); *G01S 1/68* (2013.01); *G01S 17/894* (2020.01); *G05D 1/024* (2013.01);
(Continued)

(58) Field of Classification Search
CPC ........ G01S 5/0284; G01S 1/68; G01S 17/894; G01S 5/0264; G01S 5/18; G01S 13/74;
(Continued)

(56) References Cited

U.S. PATENT DOCUMENTS

| | | | | |
|---|---|---|---|---|
| 5,406,275 A | * | 4/1995 | Hassett | G01S 13/765 |
| | | | | 340/928 |
| 2003/0028323 A1 | * | 2/2003 | Zeitler | G01S 5/14 |
| | | | | 701/408 |

(Continued)

FOREIGN PATENT DOCUMENTS

| | | | | |
|---|---|---|---|---|
| CN | 203995938 U | * | 12/2014 | |
| CN | 106541947 A | * | 3/2017 | ............ B60W 30/12 |

(Continued)

OTHER PUBLICATIONS

English Translation of CN106541947A.*
(Continued)

*Primary Examiner* — Rami Khatib
*Assistant Examiner* — Shahira Baajour
(74) *Attorney, Agent, or Firm* — Nath, Goldberg & Meyer; Jerald L. Meyer

(57) ABSTRACT

A safety system for localizing a movable machine having a safety controller, having at least one radio location system, and having at least one sensor for position determination, wherein the radio location system has radio stations arranged as stationary, wherein at least one radio transponder is arranged at the movable machine, wherein position data of the movable machine can be determined by means of the radio location system, wherein the position data can be transmitted from the radio station or from the radio transponder of the radio location system to the safety controller and position data of the movable machine can be determined by means of the sensor, and wherein the safety controller is configured to compare the position data of the radio location system and the position data of the sensor and to form checked position data on agreement.

10 Claims, 4 Drawing Sheets

(51) Int. Cl.
  *G01S 1/68* (2006.01)
  *G05D 1/02* (2020.01)
(52) U.S. Cl.
  CPC ......... *G05D 1/0272* (2013.01); *G05D 1/0274* (2013.01)
(58) Field of Classification Search
  CPC ...... G01S 13/91; G01S 13/931; G01S 15/931; G01S 17/931; G01S 5/0258; G01S 5/02521; G05D 1/024; G05D 1/0272; G05D 1/0274
  See application file for complete search history.

(56) References Cited

U.S. PATENT DOCUMENTS

| | | | |
|---|---|---|---|
| 2015/0087330 A1* | 3/2015 | Prechner | G01S 5/14 455/456.1 |
| 2018/0039269 A1* | 2/2018 | Lambermont | G01S 13/865 |
| 2018/0372923 A1* | 12/2018 | Wijaya | G02B 3/005 |

FOREIGN PATENT DOCUMENTS

| | | | |
|---|---|---|---|
| CN | 106926800 A * | 7/2017 | ......... B60R 16/0231 |
| DE | 4340756 A1 | 6/1994 | |
| DE | 102017203653 A1 | 9/2018 | |
| DE | 102017216554 A1 | 3/2019 | |
| WO | 2011128117 A2 | 10/2011 | |
| WO | 2016/032678 A1 | 3/2016 | |
| WO | 2019/048260 A1 | 3/2019 | |

OTHER PUBLICATIONS

English Translation of CN 203995938 U.*
E. Rhian Green and Sumit Roy, System Architectures for High-rate Ultra-wideband Communication Systems: A Review of Recent Developments.*
English Translation of Li (CN-106926800-A). (Year: 2023).*
German Office Action dated Jun. 30, 2020 corresponding to application No. 10 2019 132 024.0.

* cited by examiner

SAFETY SYSTEM

FIELD

The present invention relates to a safety system for localizing a movable machine having a safety controller.

BACKGROUND

There is the challenge in applications with movable machines, that is in particular autonomous mobile machines or guideless vehicles, of exactly knowing a position of the movable machine since a switching over of protective devices is, for example, necessary with reference to the position.

The switching over of the protective device is necessary, for example, since functional safety has to be situatively adapted to the demand of the application. A primary protective function, e.g. a detection of a person by means of a safe laser scanner is, for example, unsuitable since this would disrupt the automation application.

An autonomous vehicle, for example, drives through an industrial plant without any track guidance, but rather by means of map navigation. An inherently safe laser scanner takes over a primary protective function, e.g. a detection of a person, and then stops the autonomous vehicle as required. The safety function of the autonomous vehicle has to be adapted at bottlenecks, transfer points, etc. since otherwise process downtimes must be anticipated since a protected field of the primary protective function is interrupted at the bottlenecks or transfer points.

SUMMARY

It is an object of the invention to provide a solution for the above-named applications.

The object is satisfied by a safety system for localizing a movable machine having a safety controller, having at least one radio location system, and having at least one sensor for position determination, wherein the radio location system has radio stations arranged as stationary, wherein at least one radio transponder is arranged at the movable machine or wherein the radio location system has radio transponders arranged as stationary, wherein at least three radio stations are arranged at the movable machine, wherein position data of the movable machine can be determined by means of the radio location system, wherein the position data can be transmitted from the radio station or from the radio transponder of the radio location system to the safety controller and position data of the movable machine can be determined by means of the sensor, and wherein the safety controller is configured to compare the position data of the radio location system and the position data of the sensor and checked position data are formed on agreement.

The movable machine or mobile machine can, for example be a guideless vehicle, a driverless vehicle or autonomous vehicle, an automated guided vehicle (AGV), an automated mobile robot (AMR), an industrial mobile robot (IMR), or a robot having movable robot arms. The movable machine thus has a drive and can be moved in different directions.

The safety system is at least formed by the safety controller, the radio location system, and the sensor.

The position data from the radio location system are transmitted to the safety controller of the movable machine. The position data of the radio location system and the position data of the optoelectronic sensor can thus be compared in the safety controller and checked position data can, for example, be formed on an agreement. The checked position data can then be further processed by the safety controller.

The safety controller has inputs, a processing unit, and outputs. The sensor is connected to the inputs. The outputs are connected to functional units such as the drive, the brakes, and/or the steering of the movable machine. The safety controller can be a modular safety controller that is programmable via software.

A safety controller can, for example, only have binary inputs. In this respect, the signals, in particular position signals of the connected sensor, are binarily transmitted. The signals, in particular position signals of the radio location system, are also binarily transmitted.

The sensor and the radio location system measures the angle or the direction of an object and the distance from the object. The sensor can thus also be called a location sensor.

The sensor can also be directly connected to a navigation system, with the navigation system being connected to the safe controller. The sensor data of the sensor are here processed by the navigation system and position data that are formed are transmitted to the safety controller.

The safety controller can, however, also have inputs or interfaces, with data, for example data bytes having more complex data structures, being able to be read.

The outputs of the safety controller can in particular be redundant safety outputs. They are semiconductor-controlled switching outputs to safely shut down the drive of the movable machine, for example.

The invention is based on the fact that a position of the movable machine can be uniquely identified by two mutually independent features. These features are the position that is determined by the sensor and the position that is determined by the radio location system. The position is thus determined by a redundant, in particular diverse, system.

The radio location is, here, for example, based on a triangulation of at least one radio transponder at the movable machine. In this connection the radio transponders are arranged at the moveable machine. At least three radio stations that can detect the radio transponder are required for this purpose. The distance between the two radio stations is known to the radio location system here.

Or the radio location is based on a triangulation, with the radio location system having radio transponders that are arranged as stationary, with at least three radio stations being arranged at the movable machine.

It is preferably a real time location system (RTLS). The radio transponders are here arranged at the movable machine. Fixed reference points, namely the radio stations, optionally receive the radio signals from the radio transponders and can thus determine their position and so the position of the vehicle.

In this respect, the position data are transmitted from the radio location system, namely the radio stations, to the safety controller.

A local position system mode (LPS mode) can also be provided. The position is determined in a similar manner to a GPS system (global positioning system) in this process. The radio transponders here receive radio signals from different known radio transponders at specific points in time. The safety controller can determine the position of the movable machine on the basis of the location information of the radio stations and the points in time of the radio signals, with the radio transponders being arranged at the vehicle and the radio stations being arranged as stationary.

In this respect, the position data are transmitted from the radio location system, namely the radio transponders, to the safety controller.

The radio location system can also be radio frequencies of radio links such as wireless LAN or WiFi. A 2.4 GHz or a 5 GHz band is, for example, used at a bandwidth of 20 MHz or 40 MHz The radio location system can also be radio frequencies of radio networks such as Bluetooth. Radio frequencies of 2.402 and 2.480 GHz are used here. The advantage of these frequencies is that they may be operated worldwide without a license. Ranges from 0 to 100 m can be achieved depending on the power. The ranges and the associated maximum powers are includes in classes 1 to 3.

The sensor is configured, for example, to detect reflectors that are fastened at specific positions so that, on the detection of at least one reflector, the position of the movable machine can be determined by the sensor connected to the safety controller.

In a further development of the invention, the radio location system is an ultrabroadband radio location system, with the frequency used being in the range from 3.1 GHz to 10.6 GHz, with the transmission energy amounting to a maximum of 0.5 mW. An absolute bandwidth in an ultrabroadband radio location system amounts to at least 500 MHz or a relative bandwidth amounts to at least 20% of the central frequency.

The range of such a radio location system amounts, for example, to 0 to 50 m. In this respect, the short time duration of the radio pulses is used for the localization.

The radio location system thus only transmits radio waves having a low energy. The system can be used very flexibly and has no interference.

At a minimum only one single radio transponder has to be arranged at the vehicle, said radio transponder being detected by at least three radio stations arranged as stationary, with the spacing of the radio stations being known.

A plurality of radio stations, for example more than three, are preferably arranged that monitor at least some of the movement zone of the movable machine.

At least two or more radio transponders can also be arranged at the movable machine. The position of the vehicle can thereby be identified more exactly and the alignment of the vehicle in the stationary state can also be detected when the arrangement of the radio transponders at the vehicle is known.

In a further development of the invention, the sensor is an optoelectronic sensor. The optoelectronic sensor is, for example, a time of flight sensor or, for example, a triangulation sensor.

With a time of flight sensor, the light that is transmitted by a light transmitter and that is remitted by an object is received by a light receiver and the time of flight from the transmission up to the reception from the object is evaluated, whereby the distance from the object can be determined.

The sensor can, however, also be an ultrasound sensor or a radar sensor.

An ultrasound sensor transmits ultrasound and evaluates the reflected sound waves, that is the echo signals. Frequencies from 16 kHz onward are used here. Detection ranges from a few centimeters to a number of meters can be implemented here.

A radar sensor is a sensor that transmits a so-called primary signal as a bundled electromagnetic wave that receives echoes reflected from objects as a secondary signal and evaluates it according to different criteria. This is a location, namely the determination of distance and angle.

Position information or the position can be acquired from the received waves reflected from the object. As already mentioned, the angle or the direction of the object and the distance from the object can be determined from the time shift between the transmission and reception of the signal. The relative movement between the transmitter and the object can furthermore also be determined, for example by a simple multiple measurement at time intervals. The arrangement of individual measurements after one another delivers the distance and the absolute speed of the object. Contours of the object can be recognized with a good resolution of the radar sensor.

An irradiation from the radar sensor takes place, for example, largely bundled in one direction due to the antenna design. The radiation characteristics of the antenna then has a so-called lobe shape.

The wavelength of the radar is in the range of the radio waves in the short wave to microwave range. A pulse radar sensor transmits pulses having a typical duration in the lower microsecond range and then waits for echoes. The transit time of the pulse is the time between the transmission and the reception of the echoes. It is used for distance determination.

A direction of the scanning beam of a pulse radar sensor can also be effected, instead of by the alignment of the antenna or antennas, electronically by phase-controlled antenna arrays. A plurality of objects can be targeted and almost simultaneously tracked in a fast alternating manner by this.

The radar sensor works at a power of approximately 10 mW, for example. This power is so low that there are no health effects. The radar frequency permitted for this application is, for example, in the range from 76-77 GHz, corresponding to a wavelength of approximately 4 mm.

In a further development of the invention, the sensor is configured for the at least areal monitoring of a monitored zone.

The distance sensor for the at least areal monitoring of a monitored zone is a sensor for distance measurement. The distance sensor delivers distance values in at least two-dimensional space. In so doing, the sensor outputs measured values with distance indications and angle indications. For example, the distance is determined by means of time of flight methods or triangulation methods.

In a further development of the invention, the sensor is configured for the at least spatial monitoring of a monitored zone.

In a further development of the invention, a change of the safety condition of the safety controller takes place by means of the safety controller on the basis of the checked position data.

A change of the safety function of the safety system takes place by means of the safety controller on the basis of agreeing position data.

If both part systems, that is the sensor and the radio location system, deliver a consistent position that can be associated with one another, a predetermined position that is stored, for example, can be recognized and the safety controller can switch over to a different protective measure or safety function. The switching over of the protective measure can comprise, for example, a switching over of measured data contours, a switching over of protected fields, a size or shape matching of measured data contours or protected fields, and/or a switching over of the properties of a protected field. The properties of a protected field include, for example, the resolution and/or the response time of the protected field. A switching over of the protective measure can also be a safety function such as a force restriction of the drive to which the switchover is made.

In a further development of the invention, the checked position data are checked for agreement with stored position data of a safe point of interest by means of the safety controller and if there is agreement, a change of the safety function of the safety system takes place.

The safe point of interest (SPOI) is a simplified variant of a safe positioning that is restricted to a detection of particular positions in an industrial application at which it is necessary to adapt the safety system or a protective device or a safety function of the movable machine to ensure both personal protection and machine availability. The safe point of interest is a synonymous name for a safety location, that is not a singular point.

The further development is based on the fact that a safe point of interest can be uniquely identified by two mutually independent features. These features are the position that is determined by the radio location system and the position that is determined by the sensor. The safe point of interest is thus identified by a redundant, in particular diverse, system.

In a further development of the invention, the optoelectronic sensor is a distance sensor, a laser scanner, a safety laser scanner, a 3D camera, a stereo camera, or a time of flight camera.

The laser scanner, the safety laser scanner, the 3D camera, the stereo camera, or the time of flight camera monitor a two-dimensional or three-dimensional measured data contour of the environment for the position detection. It can synonymously be a monitored field.

The laser scanner or the safety laser scanner, for example, monitors a measured data contour for the position detection.

Safety systems used in safety engineering have to intrinsically work particularly reliably and inherently safely and must therefore satisfy high safety demands, for example the standard EN13849 for safety of machinery and the machinery standard EN1496 for electrosensitive protective equipment (ESPE).

To satisfy these safety standards, a series of measures have to be taken such as a safe electronic evaluation by redundant and/or diverse electronics or different functional monitoring processes, especially the monitoring of the contamination of optical components, including a front lens. A safety laser scanner in accordance with such standards is known, for example, from DE 43 40 756 A1.

The term "functionally safe" is to be understood in the sense of the standards named or of comparable standards; measures are therefore taken to control errors up to a specified safety level. The safety system and/or at least one non-safe sensor moreover generate non-safe data such as raw data, point clouds, or the like. Non-safe is the opposite of safe for non-safe safe devices, transmission paths, evaluations, and the like and accordingly said demands on fail safeness are not satisfied in this process.

A 3D camera, for example, likewise monitors a monitored zone of the movable machine by means of a plurality of detected distance values. A 3D camera has the advantage that a volume-like protected zone can be monitored.

A stereo camera, for example, likewise monitors a monitored zone of the movable machine by means of a plurality of detected distance values. The distance values are determined on the basis of the two cameras of the stereo camera that are installed at a basic spacing from one another. A stereo camera equally has the advantage that a volume-like protected zone can be monitored.

Distance values on the basis of the measured time of flight that are determined by an image sensor are determined by means of a time of flight camera. A time of flight camera equally has the advantage that a volume-like or spatial protected zone can be monitored.

In a further development of the invention, the sensor, in particular the optoelectronic sensor, is arranged at the movable machine. An optoelectronic sensor is, for example, arranged at the front side of a vehicle to detect information from the environment. A plurality of optoelectronic sensors can also be arranged, in particular at the corners of the vehicle.

The vehicle can thereby detect its own position on the basis of recognized contours or a recognized position of the environment. An orientation takes place, for example, starting from a known initial point or starting point of the movable machine and is then continuously updated using detected environmental positions.

The safety controller is in this case likewise arranged at the movable machine and is connected to the optoelectronic sensor.

In a further development of the invention, the safety system has at least one second sensor that is able to measure a movement, a position change, and/or a speed. The further sensor is arranged at the movable machine here. The further second sensor forms, in addition to the first sensor and the radio location system, a diagnosis channel for a validation of the position or for a test or check of the determined position data. The second sensor itself does not determine any position, but rather serves as a technical safety diagnosis whether the two positioning systems are still operating properly.

In a further development of the invention, the safety system has at least one encoder that detects a rotary position of a rotating axle or of a wheel, with the encoder being connected to the safety controller. The further encoder is arranged at the movable machine. The further encoder forms, in addition to the first sensor and the radio location system, a diagnosis channel for a check of the position or for a test or check of the determined position data. The encoder itself does not determine any position, but rather serves as a technical safety diagnosis whether the two positioning systems are still operating properly.

In a further development of the invention, the sensor is arranged as stationary and the position data are transmitted from the sensor to the movable machine.

The movable machine or the vehicle thereby does not need to have any sensors or active components at all for the position determination. A plurality of stationary sensors are in particular arranged spaced apart along trajectories of the movable machine to determine a position of the vehicle.

The transmission of the position data to the movable machine preferably takes place via radio. An optical data transmission can, however, also be provided.

In a further development of the invention, the safety system has a map or a map model, with safe points of interest being entered in the map or in the map model and a navigation of the movable machine taking place in the map or in the map model.

The current position and/or location of the movable machine is continuously processed in the safety controller on the basis of detected environmental contours and the map or the map model is updated. The map has a coordinate system. This kind of position determination is called a simultaneous localization and mapping (SLAM) method. In this respect, at least one position and an associated orientation in the map are known or a position of origin and an orientation of origin in the map are known. Recognized positions and/or contours are continuously entered into the map, whereby the map is expanded or changes of, for example, objects and/or travel paths are entered into the map.

In a further development of the invention, a first zone/localization unit is arranged between the sensor and the safety controller, with the first zone/localization unit converting position signals of the sensor into binary data and/or a second zone/localization unit is arranged between the radio transponder or the radio station and the safety controller, with the second zone/localization unit converting position signals of the radio transponder or of the radio station into binary data.

A simpler safety controller can thereby be used that can only process binary signals. The selection of possible safety controllers is thereby increased.

BRIEF DESCRIPTION OF THE DRAWINGS

The invention will also be explained in the following with respect to further advantages and features with reference to the enclosed drawing and to embodiments. The Figures of the drawing show in.

DETAILED DESCRIPTION

Figure 1:
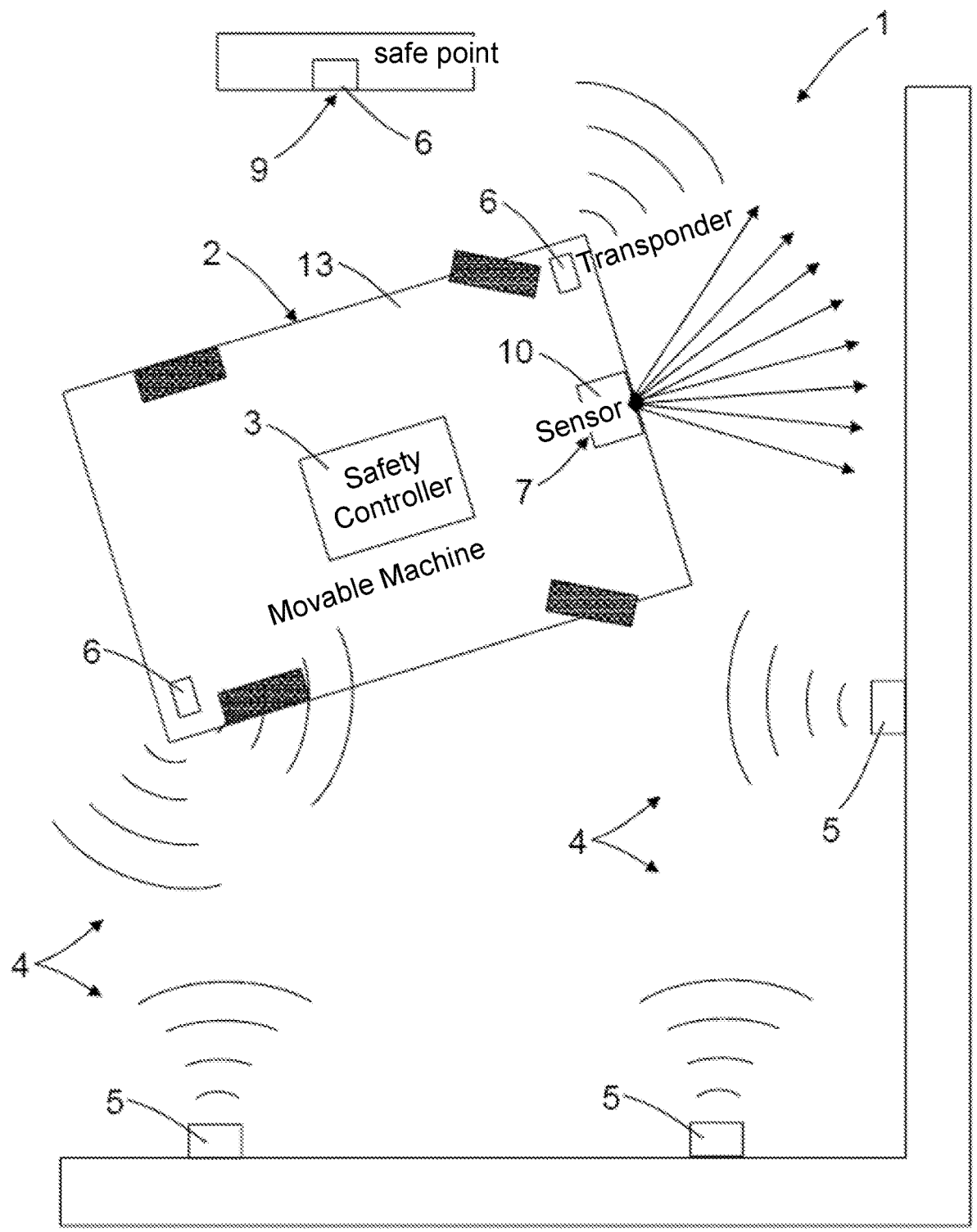
FIG. 1 a safety system for localizing a movable machine.

In the following Figures, identical parts are provided with identical reference numerals.

FIG. 1 shows a safety system 1 for localizing a movable machine 2 having a safety controller 3, having at least one radio location system 4, and having at least one sensor 7 for position determination, with the radio location system 4 having radio stations 5 arranged as stationary, with at least one radio transponder 6 being arranged at the movable machine 2 or with the radio location system having radio transponders arranged as stationary, with at least three radio stations being arranged at the movable machine, with position data of the movable machine 2 being able to be determined by means of the radio location system 4, with the position data being able to be transmitted from the radio station 5 or from the radio transponder 6 of the radio location system 4 to the safety controller 3 and position data of the movable machine 2 being able to be determined by means of the sensor 7, and with the safety controller 3 being configured to compare the position data of the radio location system 4 and the position data of the sensor 7 and checked position data being formed on agreement.

The movable machine 2 or mobile machine is, for example, in accordance with FIG. 1 a guideless vehicle, a driverless vehicle, or an autonomous vehicle 13. The vehicle 13 has a drive and can be moved or drive in different directions.

The safety system 1 is at least formed by the safety controller 3, the radio location system 4, and the sensor 7.

The position data from the radio location system 4 are transmitted to the safety controller 3 of the vehicle 13. The position data of the radio location system 4 and the position data of the sensor 7 can thus be compared in the safety controller 3 and checked position data can be formed on an agreement. The checked position data can then be further processed by the safety controller 3.

Figure 2:
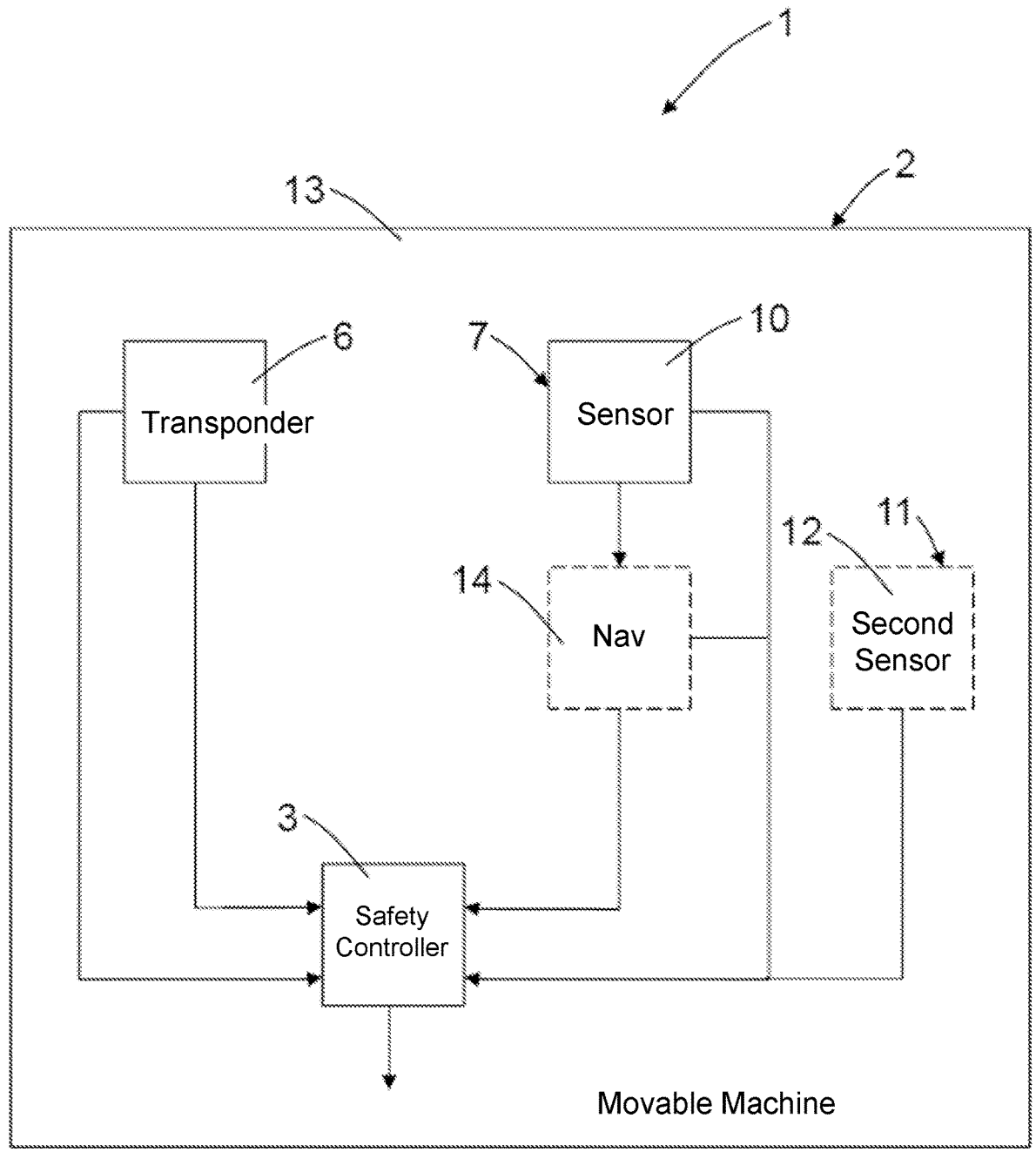
FIGS. 2 and 3 respectively a further safety system.

In accordance with FIG. 2, the safety controller 3 has inputs, a processing unit, and outputs. The sensor 7 is connected to the inputs. The outputs are connected to functional units such as the drive, the brakes, and/or the steering of the movable machine or of the vehicle 13. The safety controller 3 can be a modular safety controller that is programmable via software.

Figure 3:
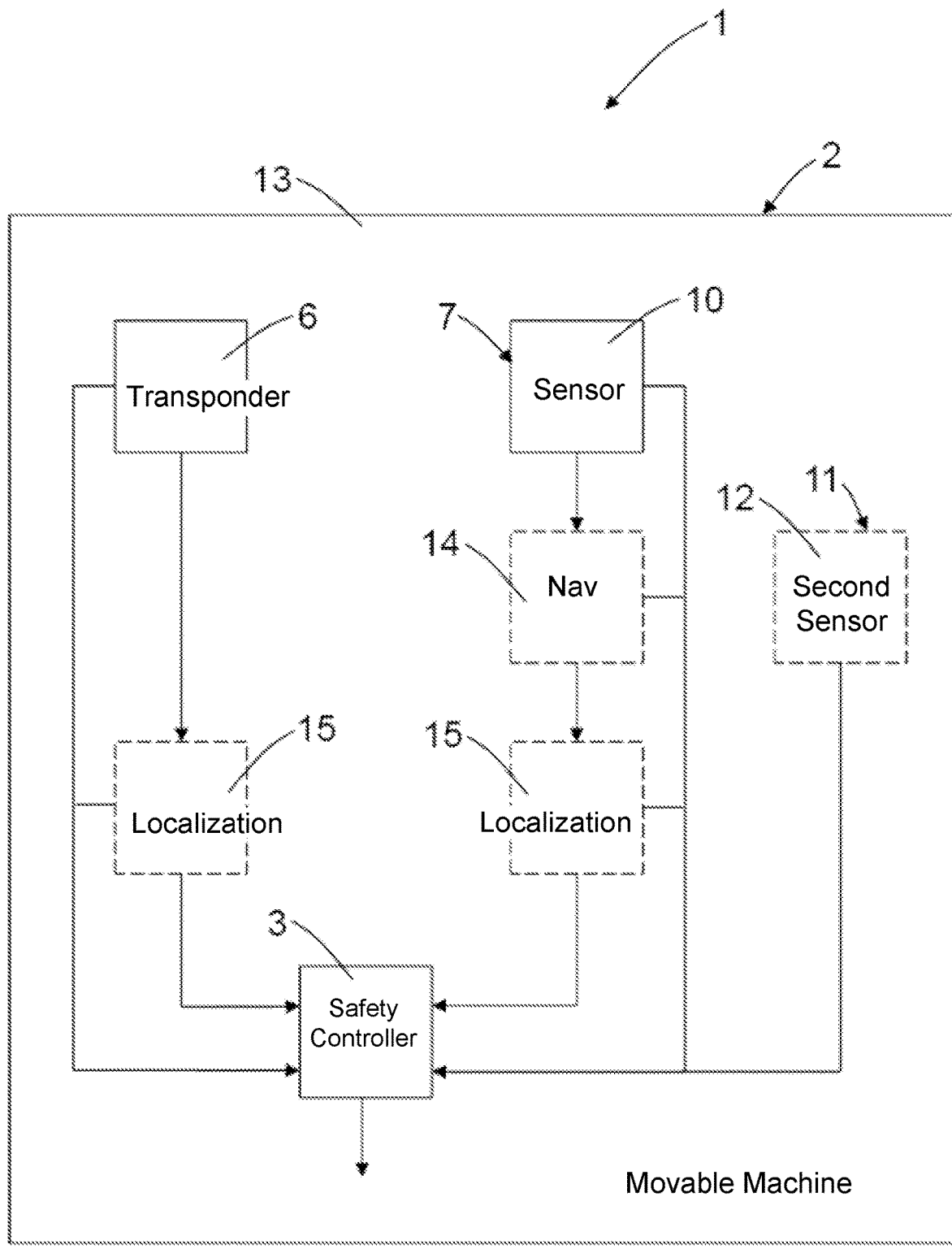

In accordance with FIG. 3, a safety controller 3 can, for example, only have binary inputs. In this respect, the signals, in particular position signals of the connected sensor 7, are binarily transmitted. The position data are converted into binary data by a zone/localization unit 15. The signals, in particular position signals of the radio location system 4, are also binarily transmitted.

The sensor 7 can also be directly connected to a navigation system 14 in accordance with FIG. 2, with the navigation system 14 being connected to the safety controller 3. The sensor data of the sensor 7 are here processed by the navigation system 14 and position data that are formed are transmitted to the safety controller 3.

The safety controller 3 can, however, also have inputs or interfaces, with data, for example data bytes or data having more complex data structures, being able to be read.

The outputs of the safety controller 3 can in particular be redundant safety outputs. They are, for example, semiconductor-controlled switching outputs to safely shut down the drive of the vehicle 13, for example.

In accordance with FIG. 1, a position of the vehicle 13 can be uniquely identified by two mutually independent features. These features are the position that is determined by the sensor 7 and the position that is determined by the radio location system 4. The position is thus determined by a redundant, in particular diverse, system.

The radio location is, here based on a triangulation of at least one radio transponder 6 at the vehicle 13. At least three radio stations 5 that can detect the radio transponder 6 are required for this purpose. The distance between the two radio stations 5 is known to the radio location system 4 here.

The sensor 7 is configured, for example, to detect reflectors that are fastened at specific positions so that, on the detection of at least one reflector, the position of the vehicle 13 can be determined by the sensor 7 connected to the safety controller 3.

In accordance with FIG. 1, the radio location system 4 is an ultrabroadband radio location system, with the frequency used being in the range from 3.1 GHz to 10.6 GHz, with the transmission energy amounting to a maximum of 0.5 mW. The range of such a radio location system 4 amounts to 0 to 50 m.

At a minimum only one single radio transponder 6 has to be arranged at the vehicle 13, said radio transponder being detected by at least two radio stations 5 arranged as stationary, with the spacing of the radio stations 5 being known.

In accordance with FIG. 1, three radio stations 5 are arranged that monitor at least some of the movement zone of the vehicle 13. In accordance with FIG. 1, two radio transponders 6 are, for example, arranged at the vehicle 13.

In accordance with FIG. 1, the sensor 7 is configured as an optoelectronic sensor 7, in particular as a distance sensor, for an at least areal monitoring of a monitored zone. The distance sensor delivers distance values in at least two-dimensional space. In so doing, the sensor outputs measured values with distance indications and angle indications. For example, the distance is determined by means of time of flight methods.

In accordance with FIG. 1, a change of the safety function of the safety controller or of the safety system takes place on the basis of the checked position data by means of the safety controller 3.

If both part systems, that is the optoelectronic sensor 7 and the radio location system 4, deliver a consistent position that can be associated with one another, a predetermined position that is stored, for example, can be recognized and the safety controller 3 can switch over to a different protective measure or safety function. The switching over of the protective measure can comprise, for example, a switching over of measured data contours, a size or shape matching of measured data contours, and/or a switching over of the properties of a measured data contour. The properties of a measured data contour include, for example, the resolution and/or the response time of the measured data contour. A switching over of the protective measure can also be a safety function such as a force restriction of the drive to which the switchover is made.

In accordance with FIG. 1, the checked position data are checked for agreement with stored position data of a safe point of interest 9 by means of the safety controller 3 and if there is agreement, a change of the safety function of the safety system 1 takes place.

The safe point of interest 9 (SPOI) is a simplified variant of a safe positioning that is restricted to a detection of particular positions in an industrial application at which it is necessary to adapt the safety system 1 or a protective device or a safety function of the vehicle 13 to ensure both personal protection and machine availability. The safe point of interest is, for example, the start of a conveying path or of a conveyor belt. A radio transponder 6 can be arranged at the safe point of interest 9.

In accordance with FIG. 1, a safe point of interest 9 can be uniquely identified by two mutually independent features. These features are the position that is determined by the radio location system 4 and the position that is determined by the laser scanner 10. The safe point of interest 9 is thus identified by a redundant, in particular diverse, system.

In accordance with FIG. 1, a 3D camera, a stereo camera, or a time of flight camera can also be arranged as a distance sensor instead of the laser scanner 10.

The laser scanner 10 monitors a two-dimensional measured data contour for the position detection. In accordance with FIG. 1, the laser scanner 10 is arranged at the vehicle 13. The laser scanner 10 is arranged at the front side of a vehicle 13 to detect information from the environment. A plurality of laser scanners 10 can also be arranged, in particular at the corners of the vehicle 13.

The vehicle 13 can thereby detect its own position on the basis of recognized contours or a recognized position of the environment. An orientation takes place, for example, starting from a known initial point or starting point of the vehicle and is then continuously updated using detected environmental positions.

The safety controller 3 is in this case likewise arranged at the vehicle 13 and is connected to the optoelectronic sensor 7.

The safety system 1 in accordance with FIG. 2 optionally has at least one second sensor 11 that is able to measure a movement, a position change, and/or a speed. The further sensor 11 is arranged at of the vehicle 13 here. The further sensor 11 forms, in addition to the optoelectronic sensor 7 and the radio location system 4, a diagnosis channel for a validation of the position or for a test or check of the determined position data.

The safety system in accordance with FIG. 2 optionally has at least one encoder 12 that detects a rotary position of a wheel, with the encoder 12 being connected to the safety controller 3. The encoder 12 is arranged at the vehicle 13. The encoder 12 forms, in addition to the optoelectronic sensor 7 and the radio location system 4, a diagnosis channel for a validation of the position or for a test or check of the determined position data. The encoder itself does not determine any position, but rather serves as a technical safety diagnosis whether the two positioning systems are still operating properly.

Figure 4:
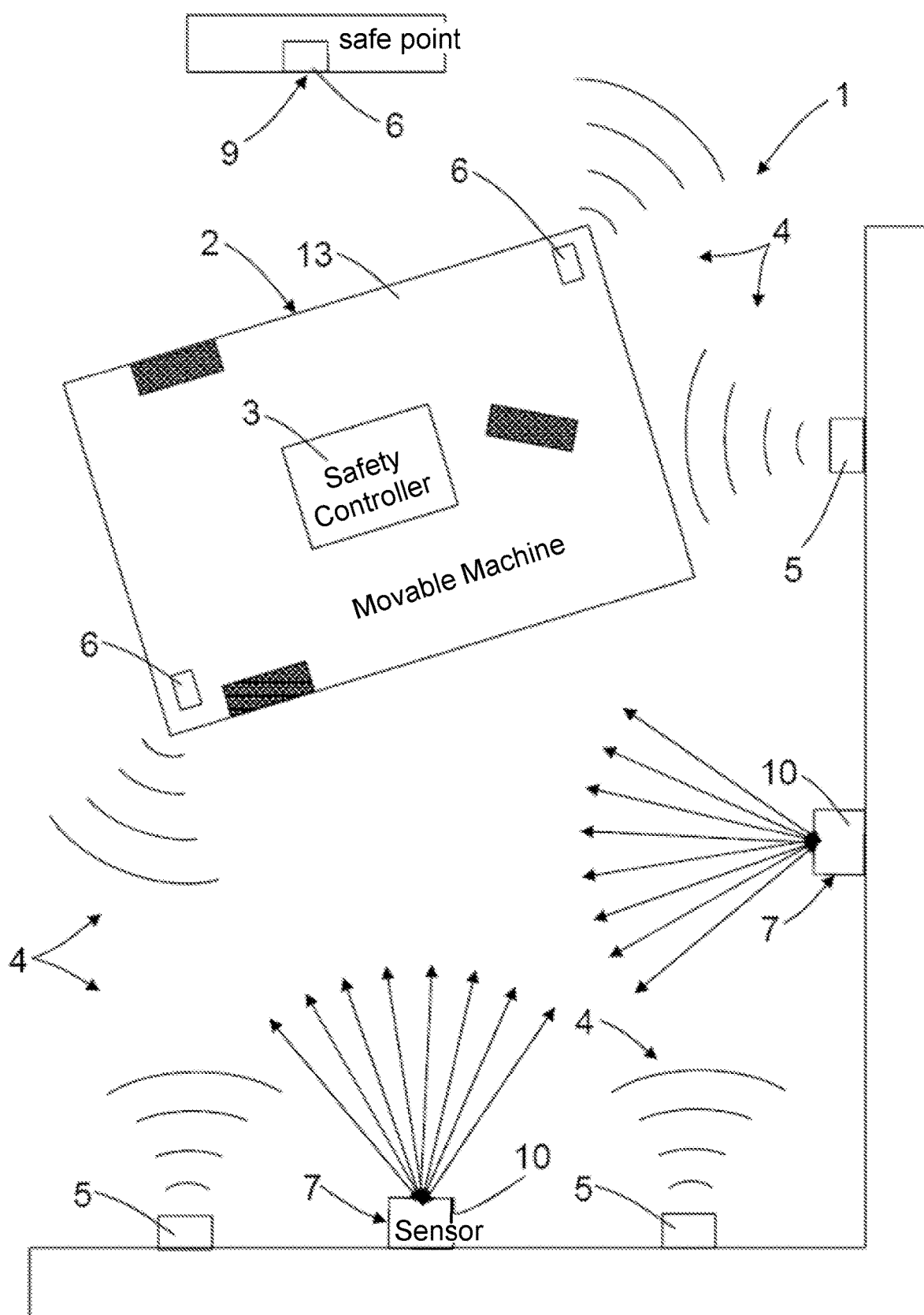
FIG. 4 a safety system for localizing a movable machine with a distance sensor arranged as stationary.

In accordance with FIG. 4, the sensor 7 is arranged as stationary and the position data are transmitted from the sensor 7 or from an optoelectronic sensor to the vehicle 13.

The vehicle 13 thereby does not need to have any sensors or active components at all for the position determination. A plurality of stationary optoelectronic sensors 7 are in particular arranged spaced apart along trajectories of the vehicle 13 to determine a position of the vehicle 13.

The transmission of the position data to the vehicle 13 preferably takes place via radio. An optical data transmission can, however, also be provided.

In an embodiment that is not shown, the safety system has a map or a map model, with safe points of interest being entered in the map or map model.

The current position and/or location of the movable machine is continuously processed in the safety controller on the basis of detected environmental contours and the map or the map model is updated. The map has a coordinate system. This kind of position determination is called a simultaneous localization and mapping (SLAM) method. In this respect, at least one position and an associated orientation in the map are known or a position of origin and an orientation of origin in the map are known. Recognized positions and/or contours are continuously entered into the map, whereby the map is expanded or changes of, for example, objects and/or travel paths are entered into the map.

REFERENCE NUMERALS 1 safety system
2 movable machine
3 safety controller
4 radio location system
5 radio stations
6 radio transponder
7 sensor or optoelectronic sensor
8 distance sensor
9 safe point of interest
10 laser scanner
11 second sensor
12 encoder
13 vehicle
14 navigation system
15 zone/localization unit

The invention claimed is:

1. A safety system for localizing a movable machine, the safety system comprising a safety controller, at least one radio location system, and at least one sensor for position determination,
   wherein the radio location system has radio stations arranged as stationary,
   with at least one radio transponder being arranged at the movable machine;
   or with the radio location system having radio transponders that are arranged as stationary, with at least three radio stations being arranged at the movable machine with position data of the movable machine being able to be determined by means of the radio location system;

with the position data being able to be transmitted from the radio station or from the radio transponder of the radio location system to the safety controller, and position data of the movable machine being able to be determined by means of the sensor;

and with the safety controller being configured to compare the position data of the radio location system and the position data of the sensor as uniquely identified by two mutually independent features, and to detect of an agreement of the compared position data of the radio location system with the position data of the sensor, whereby the compared position data provides a position indication determined by a redundant and diverse system, and whereby outputs of the safety controller are redundant safety outputs, and wherein the compared position data provides an indication of a safe point of interest as an agreement of the two uniquely identified mutually independent features, and if there is agreement of the compared position data sufficient to associate the position data of the radio location system and the position data of the sensor with one another, a change of a safety function of the safety system takes place.

2. The safety system in accordance with claim 1, wherein the radio location system is an ultrabroadband radio location system, with the frequency used being in the range from 3.1 GHz to 10.6 GHz, with transmission energy amounting to a maximum of 0.5 mW per radio station.

3. The safety system in accordance with claim 1, wherein the sensor is configured for at least spatial monitoring of a monitored zone.

4. The safety system in accordance with claim 1, wherein the sensor is one of a distance sensor, a laser scanner, a safety laser scanner, a 3D camera, a stereo camera, and a time of flight camera.

5. The safety system in accordance with claim 1, wherein the sensor is arranged at the movable machine.

6. The safety system in accordance with claim 1, wherein the safety system has at least one second sensor that is able to measure at least one of a movement, a position change, and a speed.

7. The safety system in accordance with claim 1, wherein the safety system has at least one encoder that detects one of a rotary position of a rotating axle and a rotary position of a wheel, with the encoder being connected to the safety controller.

8. The safety system in accordance with claim 1, wherein the sensor is arranged as stationary and the position data can be transmitted from the sensor to the movable machine.

9. The safety system in accordance with claim 1, wherein the safety system has one of a map and a map model, with at least one safe point of interest being entered in one of the map and the map model and a navigation of the movable machine taking place in one of the map and the map model.

10. The safety system in accordance with claim 1, wherein, on detection of the agreement of the compared position data of the radio location system with the position data of the optoelectronic sensor, the safety controller forms checked position data based on at least one of the position data of the radio location system and the position data of the sensor on detection of said agreement of the compared position data.

* * * * *